United States Patent

Braden et al.

Patent Number: 5,214,087
Date of Patent: May 25, 1993

[54] VINYL HALIDE POLYMER: ETHYLENE-VINYL ALCOHOL BLENDS CONTAINING PHENOLIC ANTIOXIDANT

[75] Inventors: Thomas C. Braden, Wellington; Sally A. Kline, Westlake, both of Ohio

[73] Assignee: The B. F. Goodrich Company, Brecksville, Ohio

[21] Appl. No.: 498,508

[22] Filed: Mar. 26, 1990

[51] Int. Cl.$^5$ .................................................. C08K 5/13
[52] U.S. Cl. ...................... 524/291; 524/340; 524/345; 524/349
[58] Field of Search ............ 524/345, 349, 340, 291; 525/57, 60; 428/461

[56] References Cited

U.S. PATENT DOCUMENTS

| | | | |
|---|---|---|---|
| 3,516,960 | 6/1970 | Martins et al. | 524/291 |
| 3,792,014 | 2/1974 | Ihrman et al. | 524/291 |
| 4,003,963 | 1/1977 | Creasy et al. | 525/57 |
| 4,347,337 | 8/1982 | Knott | 524/291 |
| 4,877,821 | 10/1989 | Hall et al. | 525/57 |

FOREIGN PATENT DOCUMENTS 0281210  9/1988  European Pat. Off. .
48-22591  3/1973  Japan .

Primary Examiner—Veronica P. Hoke
Attorney, Agent, or Firm—Miles B. Dearth

[57] ABSTRACT

Polyvinyl halide-EVOH polymer compositions exhibiting a reduced tendency to stick to metal surfaces, and in particular, to chrome surfaces are described which comprise (A) at least one vinyl halide polymer;

(B) from 1 to about 40% based on the weight of the vinyl halide polymer, of at least one ethylene-vinyl alcohol copolymer; and (C) from about 0.01 to about 5 phr of at least one phenolic antioxidant of the formula

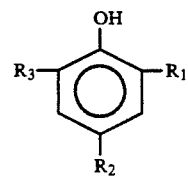

wherein $R_1$ is hydrogen, or a hydroxyl or an alkyl group; $R_2$ is an alkyl, alkoxy or a carboxylic ester group; and $R_3$ is a hydroxy or an alkyl group.

An improved process for melt blending mixtures comprising vinyl halide polymers and ethylene-vinyl alcohol copolymers on metal-surfaced compounding equipment is described which comprises adding to the mixture prior to melt blending, from about 0.01 to about 5 phr of the phenolic antioxidant described above.

5 Claims, No Drawings

VINYL HALIDE POLYMER: ETHYLENE-VINYL ALCOHOL BLENDS CONTAINING PHENOLIC ANTIOXIDANT

FIELD OF THE INVENTION

This invention relates to vinyl halide polymer compositions modified with ethylene-vinyl alcohol polymers, and more particularly, to vinyl halide polymer compositions modified with ethylene-vinyl alcohol polymers and containing at least one phenolic antioxidant.

BACKGROUND OF THE INVENTION

Polyvinyl chloride (PVC) compositions are commonly used as packaging materials for cosmetics, pharmaceuticals, foods and health care products. Polyvinyl chloride is preferentially selected for these packaging applications due to its low cost, clarity and ease of processing. In some packaging applications it is very desirable that plastic materials exhibit a very high gas impermeability. The gas barrier properties of PVC compositions are adequate for some applications but require improvement for the protection of extremely oxygen-sensitive materials.

The gas barrier properties of PVC may be improved by chemical or physical modification, or by the addition of a filler or a protective coating. A preferred approach to improving the gas barrier properties of PVC is by blending with barrier materials. Blends in general do not always have the additive properties of the two components. The properties of the blend in some instances are worse than the properties of the pure components. Therefore, blending a barrier polymer with PVC polymers does not necessarily lead to a composite with improved gas impermeability relative to PVC.

Packaging materials based on copolymers of ethylene and vinyl alcohol (EVOH) are excellent barriers to oxygen at low relative humidity, but are rather poor barriers at higher humidity conditions. One method for overcoming this problem is to blend the EVOH copolymer with a polymer that is primarily hydrophobic such as polyvinyl chloride.

U.S. Pat. No. 4,003,963 describes vinyl chloride polymer barrier packaging compositions which are blends of vinyl chloride polymers containing no carboxyl groups and about 20 to 30% by weight of an ethylene-vinyl alcohol copolymer containing greater than 50 mole percent of vinyl alcohol. The compositions are reported to have enhanced resistance to gas permeability and moisture vapor transmission.

The addition of ethylene-vinyl alcohol copolymers to polyvinyl chloride can produce a transparent compound with a permeability to oxygen that is lower than a polyvinyl chloride itself. However, when blends of PVC and EVOH polymers are melt blended on chrome surfaced compounding equipment, the highly polar EVOH preferentially adheres to the metallic surface. The "loss" of EVOH to the chrome surface is substantial and can make quantitative control of additive levels difficult. Additionally the EVOH which adheres to the chrome must be removed between batches thereby increasing the cost of the blending process.

SUMMARY OF THE INVENTION

Polyvinyl halide-EVOH polymer compositions exhibiting a reduced tendency to stick to metal surfaces, and in particular, to chrome surfaces are described which comprise (A) at least one vinyl halide polymer;

(B) from 1 to about 40% based on the weight of the vinyl halide polymer, of at least one ethylene-vinyl alcohol copolymer; and (C) from about 0.01 to about 5 phr of at least one phenolic antioxidant of the formula

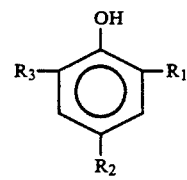

wherein $R_1$ is hydrogen, or a hydroxyl or an alkyl group; $R_2$ is an alkyl, alkoxy or a carboxylic ester group; and $R_3$ is a hydroxy or an alkyl group.

An improved process for melt blending mixtures comprising vinyl halide polymers and ethylene-vinyl alcohol copolymers on metal-surfaced compounding equipment is described which comprises adding to the mixture prior to melt blending, from about 0.01 to about 5 phr of the phenolic antioxidant described above.

DESCRIPTION OF THE PREFERRED EMBODIMENTS

(A) The Vinyl Halide Polymers

The vinyl halide polymers which are utilized in preparation of the improved polymer compositions of the present invention include the homopolymers and copolymers of vinyl halides including, for example, vinyl chloride and vinyl bromide. The vinyl halides may be copolymerized with each other or each of them may be copolymerized with one or more polymerizable olefinic monomers having at least one terminal $CH_2=C<$- grouping. As examples of such olefinic monomers, there may be mentioned the alpha, beta-olefinically unsaturated carboxylic acids such as acrylic acid, methacrylic acid, ethacrylic acid, alpha-cyanoacrylic acid, etc.; esters of acrylic acid such as methylacrylate, ethylacrylate, butylacrylate, octylacrylate, cyanoethylacrylate, etc.; esters of methacrylic acid such as methylmethacrylate, butylmethacrylate, etc.; nitrile such as acrylonitrile, methacrylonitrile, etc.; acrylamides such as methylacrylamide, N-methylol acrylamide, N-butoxy methylacrylamide, etc.; vinyl ethers such as ethyl vinyl ether, chloroethyl vinyl ether, etc.; the vinyl ketones; styrene and styrene derivatives such as methyl styrene, vinyl toluene, chlorostyrene, etc.; vinyl naphthalene; esters such as allyl or vinyl chloroacetate, vinyl acetate, etc.; vinyl pyridene; methyl vinyl ketone; the diolefins, including butadiene, isoprene, chloroprene, etc.; and other polymerizable olefinic monomers of the types known to those skilled in the art.

The vinyl halide polymers particularly useful in the present invention as component (A) are homopolymers and copolymers made by the polymerization of vinyl chloride alone or in admixture with one or more polymerizable olefinic monomers copolymerizable therewith in amounts up to about 20% by weight based on the weight of the monomer mixtures. The most preferred vinyl polymer, or resin, is polyvinylchloride (PVC) homopolymer produced by mass polymerization or suspension polymerization. In order to simplify the discussion and to minimize the examples used to illustrate the invention, the invention generally will hereinafter be described in connection with PVC, it being understood that this is merely intended to be illustrative and not limiting.

The preparation of vinyl halide polymers, and particularly, polyvinylchloride polymers including homopolymers and copolymers, is well known in the art. Examples of patents describing polyvinyl halides and the preparation of polyvinyl halides include U.S. Pat. Nos. 4,751,118, 4,748,218 and 4,728,677. Vinyl halide polymers and copolymers, and in particular polyvinylchloride homopolymers and copolymers are available commercially such as, from the B. F. Goodrich Company, Akron, Ohio under the general trade designation Geon.

(B) The Ethylene-Vinyl Alcohol Copolymers (EVOH).

Ethylene-vinyl alcohol copolymers (EVOH) suitable for use in this invention will generally contain from about 15% to about 55 mole percent of ethylene and from about 45 to about 85 mole percent of vinyl alcohol. The preferred copolymers will contain from about 20 to about 50 mole percent of ethylene. Since these copolymers generally are prepared by the hydrolysis of ethylene-vinyl acetate copolymers, some residual vinyl acetate may be present in the copolymers. Generally, there will be less than about 3% by weight of residual vinyl acetate in the EVOH copolymers. The EVOH copolymers typically have molecular weights in the range of from about 10,000 to about 40,000 corresponding roughly to melt indicies of about 0.5 to about 15 or higher, and more generally from about 0.5 to about 6.0 as determined by ASTM Test D-1238 Procedure E or L using a weight of 2160 grams and a temperature of 190° C. Typically, the EVOH copolymers will have densities of about 1.1 to 1.2, and the melting points of from about 150 to about 200° C. or higher.

Ethylene-vinyl alcohol copolymers useful in this invention are commercially available from the EVAL Company of America under "SC" designations. Examples of EVOH copolymers available from this company are identified in the following Table I.

TABLE I

| EVAL Grade | EVOH Resins Ethylene (mole %) | Melt Index* |
|---|---|---|
| SC-F 100 | 32 | 0.6 |
| SC-F 101 | 32 | 1.3 |
| SC-F 104 | 32 | 4.4 |
| SC-H 101 | 38 | 1.5 |
| SC-K 102 | 38 | 2.9 |
| SC-E 105 | 44 | 5.5 |
| SC-G 115 | 48 | 15.0 |

*Melt index at 190° C./2160 gm., gm/10 min.

A series of EVOH copolymers is also available from DuPont with about the same range of ethylene content under the general trade designation "Selar".

The amount of EVOH incorporated into the vinyl halide polymer compositions of the present invention may vary over a wide range although amounts are from about 1 to about 40% by weight, based on the weight of the vinyl halide polymer generally are found to provide desirable results. In another embodiment, from about 5 to about 40% by weight of the EVOH copolymer is included in the compositions of the present invention.

(C) The Phenolic Antioxidant

The polymer blends also contain at least one phenolic antioxidant of the formula

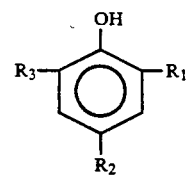

wherein $R_1$ is hydrogen, or a hydroxyl or an alkyl group; $R_2$ is an alkyl, alkoxy or a carboxylic ester group; and $R_3$ is a hydroxy or an alkyl group.

The alkyl groups are generally lower alkyl groups containing, for example, from 1 to about 6 carbon atoms, and, similarly, the alkoxy groups are lower alkoxy groups containing from about 1 to about 6 carbon atoms. Examples of alkyl groups include methyl, ethyl, propyl, n-butyl, secondary butyl, and tertiary butyl. Examples of alkoxy groups include methoxy, ethoxy, etc.

The carboxylic ester groups may be represented by the formula —$COOR_4$ wherein $R_4$ is a lower alkyl group such as methyl, ethyl, propyl, etc.

Specific examples are the phenolic antioxidants of the type represented by the above formula include: 2,6-di-tert-butyl-p-cresol or butylated hydroxy toluene (BHT); 2-tertiary-butyl-4-methoxy phenol or butylated hydroxy anisole (BHA); and propyl gallate which is the propyl ester of 3,4,5-trihydroxy benzoic acid.

In one embodiment, the alkyl groups of $R_1$ and $R_3$ are tertiary alkyl groups attached to the ring through a tertiary carbon atom. A preferred tertiary alkyl group is the tertiary butyl group.

The amount of the phenolic antioxidant incorporated into the polymer blends of the present invention ranges from about 0.01 to about 5 phr. In another embodiment, the polymer blends of the present invention contain from about 0.1 to about 2 phr of the phenolic antioxidant (C).

The polymer blends of the present invention, in addition to the vinyl halide polymer (A), the EVOH copolymer (B) and the phenolic antioxidant (C) generally will contain additional materials normally incorporated into vinyl chloride polymers for various purposes. For example, the vinyl halide polymer compositions may contain various additives including: impact modifiers such as methyl methacrylate-butadiene-styrene terpolymers; extrusion aids such as methyl methacrylate polymers; heat stabilizers such as dioctyl tin mercaptide and maleates; auxiliary antioxidants such as epoxidized soybean oil; lubricants such as hydrocarbon waxes, oils, stearic acid and glycerol monostearate; ultraviolet stabilizers such as benzophenones, colorants, etc. These supplemental additives may be present at levels from 0.01% up to about 20% to about 25% by weight of the vinyl chloride polymer.

Various components which comprise the polymer blends of the present invention described above are thoroughly mixed together to form the desired blend. Mixing may be accomplished by any of the customary methods known to those skilled in the art such as with a Banbury, Henshel, roll mills or other mixers.

Blending of the various components can be accomplished on an extruder or on a two-roll mill, and the materials can then be cut into strips, cubed and extruded on a Brabender fitted with a strip die.

An important feature or property of the polymer blends of the present invention is that the blends containing the specified phenolic antioxidants can be melt blended on metal-surface compounding equipment when the phenolic antioxidant is added to the mixture of vinyl halide polymer and EVOH prior to melt blending the mixture. In the absence of the specified phenolic antioxidants, attempts to melt blend the PVC-EVOH mixture in the equipment involving contact of the mixture with metal, particularly chromium, results in loss of EVOH from the mixture because the highly polar EVOH preferably adheres to the metallic surface. However, when the phenolic antioxidants specified above are incorporated into the PVC-EVOH mixtures prior to melt blending and metallic contact, the phenolic antioxidant inhibits the adhesion of the EVOH to the metallic surface. The improvements are particularly significant when the metallic surfaces are chrome surfaces.

The following examples illustrate the polymer blends of the present invention which exhibit a reduced tendency to deposit EVOH from the blend onto metallic surfaces such as chrome surfaces. In each of the examples, parts are by weight, and the identified components are compounded and milled on a two-roll mill. The relative tendencies of the mixtures of Control-1 and Examples 1-6 to adhere to the mill are noted. The PVC homopolymer mixture utilized in each of these examples contains the following components and amounts.

| PVC Homopolymer Blend-1 | |
| --- | --- |
| Ingredients | Amounts |
| PVC Homopolymer | 100 |
| Stabilizers | 2.35 |
| Lubricants | 1.1 |
| Processing Aids | 1.85 |
| Impact Modifiers | 9.0 |
| Pigments | 0.132 |

Polymer blends of the present invention utilizing the above PVC resin composition are summarized in the following Table I.

TABLE I

| | PVC-EVOH-Antioxidant Blends | | | | | | |
| --- | --- | --- | --- | --- | --- | --- | --- |
| | | Example | | | | | |
| Ingredients | Control-1 | 1 | 2 | 3 | 4 | 5 | 6 |
| PVC Blend-1 | 500 | 500 | 500 | 500 | 500 | 500 | 500 |
| EVOH (SCH-101-B) | 60 | 60 | 60 | 60 | 60 | 60 | 60 |
| BHT | — | 2.5 | 10.0 | — | — | — | — |
| BHA | — | — | — | 2.5 | 10.0 | — | — |
| Propyl Gallate | — | — | — | — | — | 2.5 | 10.0 |

The tendency of the mixture of the above examples to stick tot he mill is noted in the following Table II.

TABLE II

| Example | Evaluation |
| --- | --- |
| Control-1 | Very sticky and difficult to remove from mill |
| 1 | Does not stick to the mill |
| 2 | Easily removed from the mill |

TABLE II-continued

| Example | Evaluation |
| --- | --- |
| 3 | Not as good as No. 1 but still better than Control-1 |
| 4 | Easily removed from the mill |
| 6 | Sticks to the mill but easier to remove than Control-1 |

The following examples illustrate additional examples of the polymer blends of the present invention.

EXAMPLE 7

| Ingredient | Amount |
| --- | --- |
| Polypropylene-Polyvinyl Chloride Copolymer | 400 |
| EVOH (SCH-101) | 40 |
| Stabilizers | 8 |
| Lubricants | 3.2 |
| BHT | 2.0 |

EXAMPLE

| Ingredient | Amount |
| --- | --- |
| Polypropylene-Polyvinyl Chloride Copolymer | 400 |
| EVOH (SCH-101) | 40 |
| Stabilizers | 8 |
| Lubricants | 3.2 |
| Propyl Gallate | 2.0 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. An improved process for melt blending mixtures comprising vinyl halide polymers and ethylene-vinyl alcohol copolymers on metal-surfaced compounding equipment which comprises adding to the mixture prior to melt blending, from about 0.01 to about 5 phr of a phenolic antioxidant of the formula

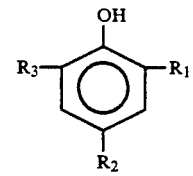

wherein $R_1$ is hydrogen, or a hydroxyl or an alkyl group; $R_2$ is an alkyl, alkoxy or a carboxylic ester group; and $R_3$ is a hydroxy or an alkyl group.

2. The process of claim 1 wherein the phenolic antioxidant compound is 2,6-ditertiary-butyl-p-cresol.

3. The process of claim 1 wherein the phenolic antioxidant compound is tertiary-butyl-4-methoxy phenol.

4. The process of claim 1 wherein the phenolic antioxidant is propyl gallate.

5. The process of claim 1 wherein the metal surface of the compounding equipment is a chrome surface.

* * * * *